US007351018B2

(12) United States Patent
Odén et al.

(10) Patent No.: US 7,351,018 B2
(45) Date of Patent: Apr. 1, 2008

(54) METHOD AND APPARATUS FOR MEASURING A DEPTH OF HOLES IN COMPOSITE-MATERIAL WORKPIECES BEING MACHINED BY AN ORBITING CUTTING TOOL

(75) Inventors: Erik Odén, Täby (SE); Björn Pettersson, Järfälla (SE)

(73) Assignee: Novator AB, Spanga (SE)

( * ) Notice: Subject to any disclaimer, the term of this patent is extended or adjusted under 35 U.S.C. 154(b) by 279 days.

(21) Appl. No.: 10/559,640

(22) PCT Filed: Jun. 1, 2004

(86) PCT No.: PCT/SE2004/000837

§ 371 (c)(1), (2), (4) Date: Dec. 2, 2005

(87) PCT Pub. No.: WO2004/106847

PCT Pub. Date: Dec. 9, 2004

(65) Prior Publication Data

US 2006/0159537 A1 Jul. 20, 2006

(51) Int. Cl.
*B23B 49/00* (2006.01)
*G01B 7/06* (2006.01)
*B23C 1/00* (2006.01)

(52) U.S. Cl. ...................... 409/131; 409/188; 409/190; 409/200; 408/1 R; 408/124; 340/680

(58) Field of Classification Search ................ 409/131, 409/132, 188, 190, 191, 200, 133, 184, 186, 409/193, 207, 231, 74, 80; 408/1 R, 124, 408/10, 11, 12, 13, 14, 130; 340/680, 683; 73/104, 660

See application file for complete search history.

(56) References Cited

U.S. PATENT DOCUMENTS 4,397,188 A * 8/1983 Bansevichus et al. ......... 73/651
4,451,892 A * 5/1984 McMurtry .................. 408/13
4,644,335 A 2/1987 Wen
4,657,451 A * 4/1987 Tanaka ...................... 409/186
4,765,784 A * 8/1988 Karwan ...................... 408/13

(Continued)

FOREIGN PATENT DOCUMENTS

DE 32 06 354 2/1982

(Continued)

*Primary Examiner*—Dana Ross
(74) *Attorney, Agent, or Firm*—Taylor & Aust, P.C.

(57) ABSTRACT

A method and apparatus for measuring a hole depth in a composite-material workpiece machined by a orbital cutting tool, including the steps of applying a low-level electric potential to an electrically insulated cutting tool having a cutting head with radial and axial cutting edges and with a predetermined axial length; determining a first zero reference position as the cutting tool initially contacts a first surface of the workpiece and closes an electric circuit through the grounded workpiece; and detecting a second reference position when the cutting head penetrates an opposite, second surface of the workpiece. The finished hole depth is determined by deducting the predetermined axial length of the cutting head from the total length of axial advancement from the first zero reference position to the second reference position. The orbital machining apparatus includes ceramic bearings electrically insulating the spindle and the cutting tool from surrounding components of the apparatus.

5 Claims, 3 Drawing Sheets

12 30 26 28 40 13 40 24 40

U.S. PATENT DOCUMENTS

| | | | | |
|---|---|---|---|---|
| 5,123,789 | A * | 6/1992 | Ohtani et al. | 408/1 R |
| 5,139,376 | A * | 8/1992 | Pumphrey | 408/1 R |
| 5,663,504 | A * | 9/1997 | Kluft | 73/660 |
| 5,688,160 | A * | 11/1997 | Pozzetti et al. | 73/468 |
| 5,971,678 | A | 10/1999 | Linderholm | |
| 6,309,151 | B1 | 10/2001 | Sacchetti | |
| 6,382,890 | B1 * | 5/2002 | Linderholm | 409/191 |
| 6,663,327 | B2 * | 12/2003 | Linderholm et al. | 409/190 |

FOREIGN PATENT DOCUMENTS

| | | |
|---|---|---|
| DE | 43 40 249 | 11/1993 |
| DE | 100 56 184 | 11/2000 |
| SE | A 9003587-4 | 11/1990 |
| WO | WO 01/15870 | 3/2001 |
| WO | WO 03/008136 | 1/2003 |

* cited by examiner

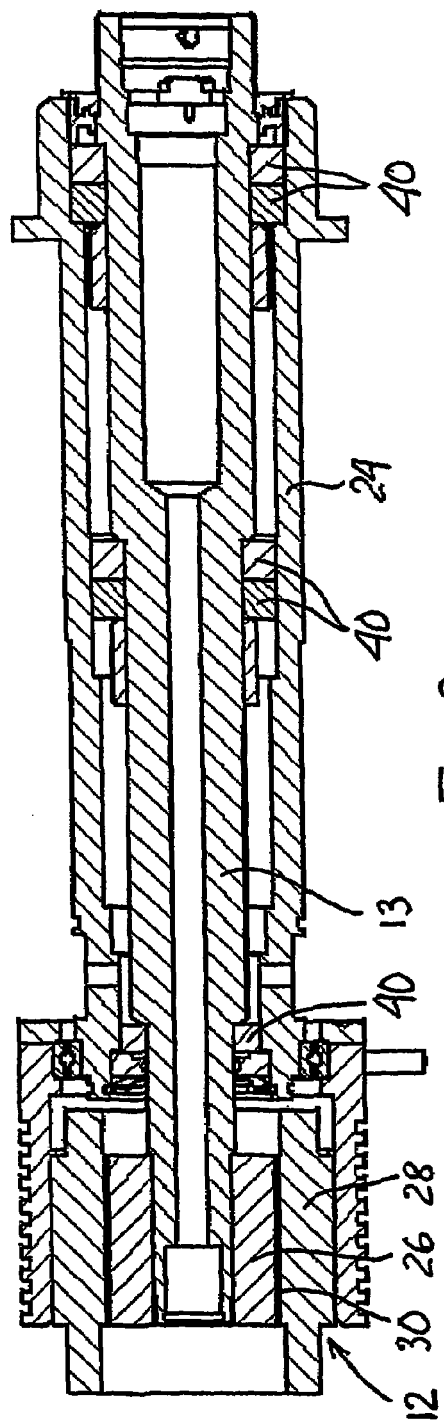
Fig.2
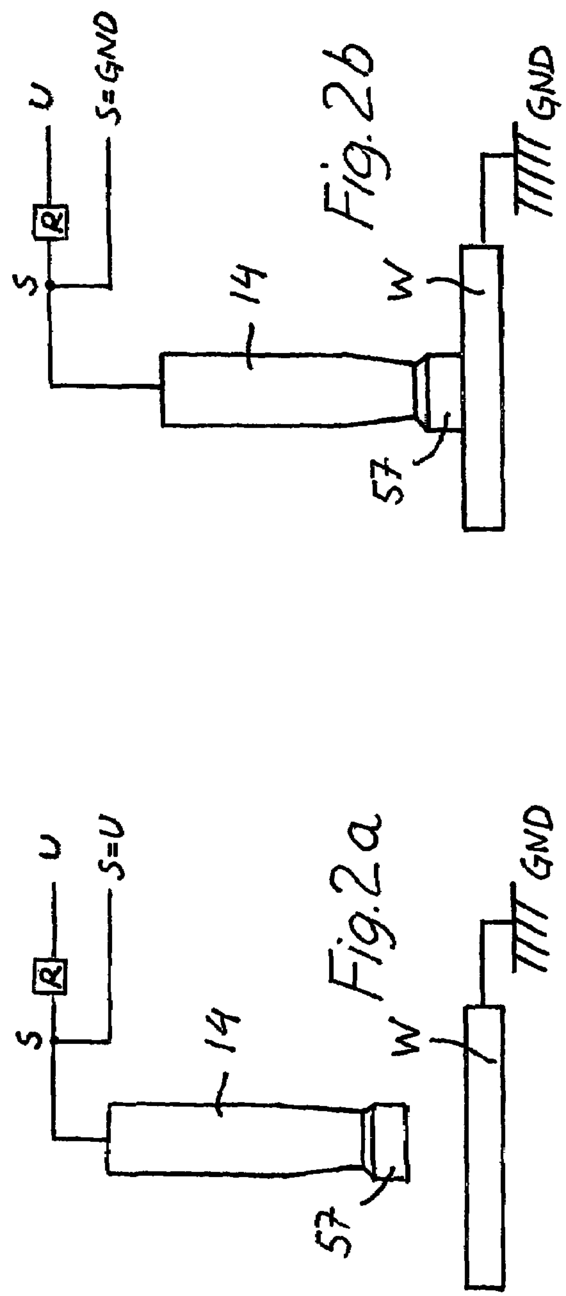
Fig.2b
Fig.2a

W
62
14
57
$W_2$
$W_1$

W
58
62
d
14
57
60
$W_2$
$W_1$ $W_1$
W
60
57
14
58
$W_2$
L
62

METHOD AND APPARATUS FOR MEASURING A DEPTH OF HOLES IN COMPOSITE-MATERIAL WORKPIECES BEING MACHINED BY AN ORBITING CUTTING TOOL

BACKGROUND OF THE INVENTION

1. Field of the Invention

The present invention relates to a method and an apparatus for measuring a depth of a hole in a composite-material workpiece machined by a rotating cutting tool orbiting about a principal axis. The present invention is, in particular, useful when making holes in multilayered workpieces, for example in various fiber-reinforced composite materials, laminates or material stacks including at least two layers material for use in the aircraft and space technologies.

2. Description of the Related Art

In aircraft multilayered components the thickness thereof may vary along the extent of the workpiece and thus the depth of the holes being formed therein may vary accordingly. It is important to accurately determine the individual depth of each hole being formed so as to be able to properly match the hole with an individual, accurately fitting fastener, such as a bolt or a blind fastener. Also, it is desirable to minimize the axial movement of the cutting tool in order to avoid unnecessary drilling in the air after having penetrated the workpiece.

A previous method of detecting the initial contact between a cutting tool and the surface of the workpiece and to determine when the cutting tool reaches various interfaces and depths of a multilayered workpiece is disclosed in the U.S. Pat. No. 4,644,335. This method involves the steps of detecting and analyzing output signals as to the acoustic signatures thereof, e.g. waveforms, amplitudes and frequencies of the output signals. However, such measuring methods are sensitive to disturbances and interferences caused by and transferred from mechanical working operations being performed simultaneously on other locations of the same workpiece. This may jeopardize the reliability of the measuring results of the depth in the respective hole.

What is needed in the art is a method and apparatus capable of determining the exact initial position of contact (a first zero reference position) between an axial cutting edge of a cutting head of the cutting tool and a first surface of the workpiece and to determine the exact position when radial cutting edges of the cutting head has fully penetrated the opposite, second surface of the workpiece.

SUMMARY OF THE INVENTION

The present invention provides a method and apparatus capable of determining the exact initial position of contact (a first zero reference position) between an axial cutting edge of a cutting head of the cutting tool and a first surface of the workpiece and to determine the exact position when radial cutting edges of the cutting head has fully penetrated the opposite, second surface of the workpiece. The distance between the point of entrance and the point of exit of the cutting head in the workpiece (the depth of the hole) can be calculated by way of a measuring element for measuring the axial movement of the spindle unit and the cutting tool, e.g. a linear encoder built in to the machine tool.

According to one aspect of the present invention this can be carried out by deducting a predetermined axial length of the radial cutting edges of the cutting head having penetrated the workpiece from the total length of axial advancement of the cutting tool from the first zero reference position to the point where the cutting head breaks of an electric circuit through the workpiece. More specifically, the method of the present invention includes the steps of:

a) applying a low-level electric potential to an electrically insulated cutting tool, the cutting tool having a longitudinal center axis and a cutting head with radial and axial cutting edges and with a predetermined axial length;

b) rotating the cutting tool about the longitudinal axis;

c) axially advancing the cutting tool towards the workpiece;

d) determining a first zero reference position of the cutting tool as it initially makes contact with a first outer surface of the workpiece and thereby closing an electric circuit through a grounded workpiece;

e) keeping a measuring element for measuring an axial movement of the cutting tool activated from the first zero reference position;

f) performing an orbital rotation of the cutting tool about a principal axis;

g) axially feeding the cutting tool into the workpiece;

h) monitoring a specific character of the electric potential during the advancement of the cutting tool through the workpiece;

i) detecting the point of breaking of the electric circuit when the cutting head of the cutting tool penetrates an opposite, second surface of the workpiece; and j) determining by help of the measuring element the depth of the hole by deducting the predetermined axial length of the cutting head having penetrated the workpiece from the total length of axial advancement of the cutting tool from the first zero reference position to the point of breaking of the electric circuit through the workpiece.

According to another aspect of the present invention the depth of the hole being produced can be calculated by also determining a second reference position of the cutting tool by axially backing the cutting tool to make contact with the second surface of the workpiece after having penetrated the same so as to reclose an electric circuit through the workpiece and ground. An accurate determination of the depth of the hole produced by the cutting tool may thus be obtained by the help of the two reference positions registered by the linear encoder. More specifically, the method of the present invention includes, in addition to the aforementioned steps a-i), the steps of:

k) performing a small incremental increase of the radial offset of the cutting tool;

l) axially backing the cutting tool to make contact with the second surface of the workpiece for determining a second reference position of the cutting tool as it recloses the electric circuit; and m) calculating the depth of the hole produced by the cutting tool by the help of the obtained two reference positions.

Furthermore, owing to the present method of sensing the exact position where the cutting head has fully penetrated the workpiece, it is also possible to minimize the axial movement of the cutting tool in order to avoid unnecessary drilling in the air of the cutting tool after the penetration of the workpiece.

The composite-material workpiece can include at least two layers of material, and at least one of the layers can include a fiber-reinforced composite material.

The present invention also relates to an orbital machining apparatus for producing a hole in a composite-material workpiece and measuring the depth of the hole being produced. The apparatus includes an orbital machining apparatus for producing a hole in a composite-material workpiece and measuring the depth of the hole being produced, including a rotatable spindle for carrying a cutting tool having a longitudinal center axis and a cutting head with radial and axial cutting edges and with a predetermined axial length. A first actuator is configured for rotating the cutting tool about its longitudinal center axis during the machining of the hole. A second actuator is configured for moving the cutting tool in an axial feed direction towards and into the workpiece substantially parallel to the tool axis, the second actuator being simultaneously operable with the first actuator. A third actuator is configured for rotating the cutting tool about a principal axis, the principal axis being substantially parallel to the center axis of the tool and coaxial with a longitudinal center axis of the hole to be machined. The third actuator is simultaneously operable with the first and second actuators. A radial offset mechanism is configured for controlling the radial distance of the center axis of the cutting tool from the principal axis, characterized in that the spindle is connected to a low voltage source and to a measuring element for measuring the axial movement of the spindle. The spindle is provided with ceramic bearings electrically insulating the spindle from surrounding components of the orbital machining apparatus. The measuring element is configured to register a first zero reference position of the cutting tool, when the cutting tool initially makes contact with a first surface of the workpiece and closes an electric circuit with the ground through the workpiece; and to register a second reference position, either when the electric circuit is broken as the cutting head has penetrated an opposite second surface of the workpiece, or when the cutting head, after having penetrated the second surface, is backed to make contact with the second surface of the workpiece for determining a second reference position of the cutting tool as it recloses the electric circuit with ground.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a cross-sectional view of an embodiment of electrically insulated spindle unit used in the orbital machining apparatus according to the invention;

FIGS. 2*a* and 2*b* are schematic side views of a cutting tool out of and in electric contact with a workpiece, respectively;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
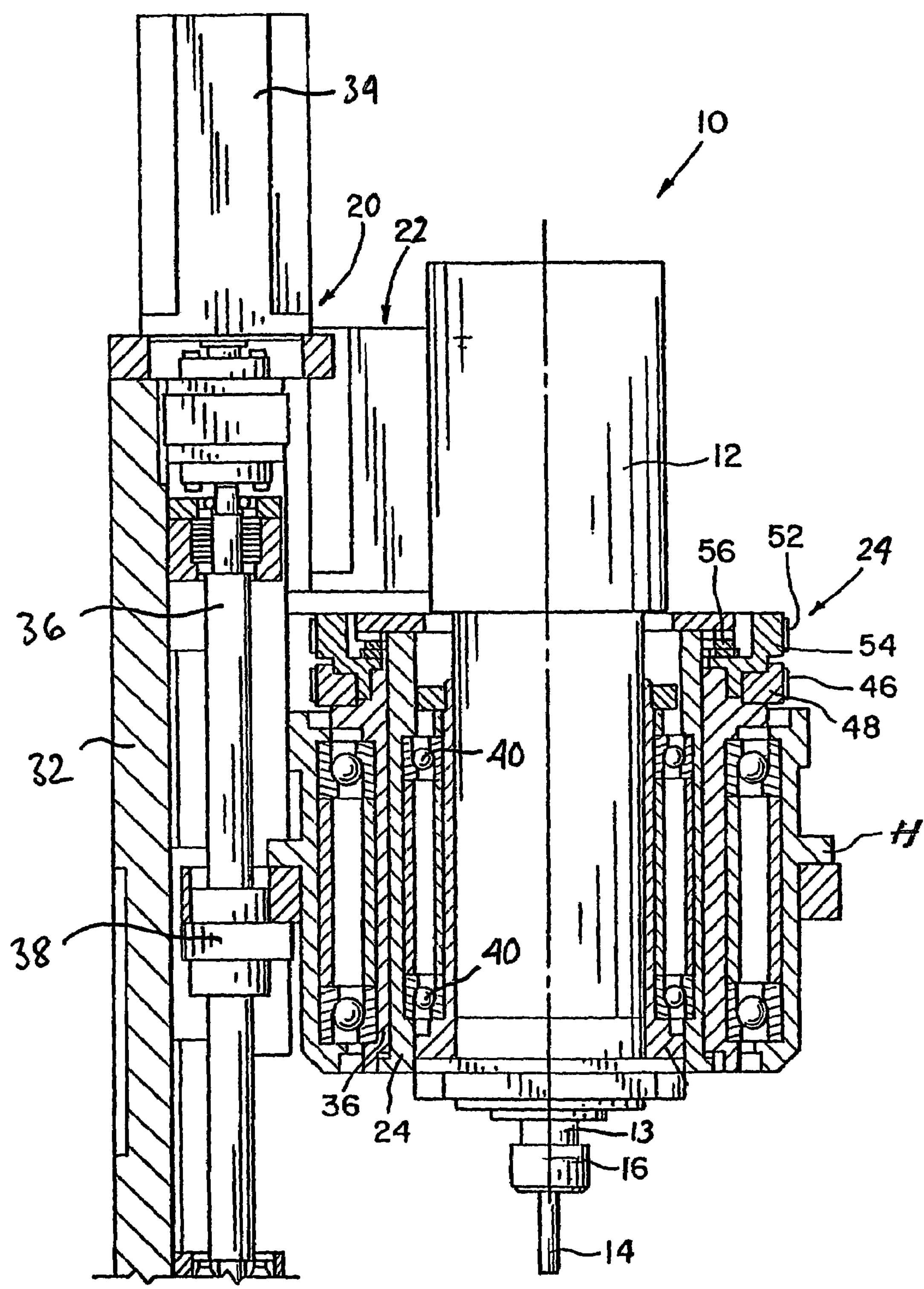
FIG. 1 is a longitudinal cross-sectional view of an orbital machining apparatus according to the apparatus of the present invention.

Referring now to the drawings, and more particularly to FIG. 1, in the method of the present invention for measuring the depth of a hole being machined in a composite-material workpiece an orbital machining apparatus 10 is used. Orbital machining apparatus 10 includes at least some of, and/or similar, elements such as described in e.g. WO 01/15870 A2, WO 03/008136 A1, U.S. Pat. No. 5,971,678, incorporated herein by reference. A first actuator in a form of a spindle motor unit 12 is configured for rotating a spindle 13 and a cutting tool 14 having a longitudinal center axis 16 during the machining of the hole; a second actuator 20 configured for moving cutting tool 14 in an axial feed direction towards and into the workpiece substantially parallel to tool axis 16, the second actuator 20 being simultaneously operable with first actuator 12. A third actuator 22 is configured for rotating cutting tool 14 about a principal axis, the principal axis being substantially parallel to center axis 16 of cutting tool 14 and coaxial with a longitudinal center axis of the hole to be machined. The third actuator 22 is simultaneously operable with first and second actuators 12, 20; and a radial offset mechanism 24 is configured for controlling the radial distance of center axis 16 of cutting tool 14 from the principal axis.

As shown more in detail in FIG. 2, spindle motor unit 12 includes an electric motor, which may include an inner rotor 26 and an outer stator 28 with an air gap 30 therebetween. Apparatus 10 may be slideably mounted to a stationary stand 32 (FIG. 1) or mounted to a movable member, such as a robot arm (not shown). Second actuator 20 includes an axial feed mechanism including a stationary motor 34 which drives a ball screw 36 engaging a ball nut 38 fixedly secured to a machine housing H. As motor 34 rotates, machine 10 will slide either forwardly or rearwardly on stand 32 thereby moving cutting tool 14 axially.

Radial offset mechanism 24 basically includes an inner hollow cylindrical body 44 rotatably supporting spindle 13 in an eccentric hole therein by way of ceramic bearings 40 which electrically insulate spindle 13 from the surrounding components of the machine. The eccentric hole has a longitudinal center axis that is parallel to but radially offset a distance from the longitudinal center axis of inner cylindrical body 44. Eccentric inner cylindrical body 44 is, in its turn, rotatably supported within an axially extending eccentric hole of a second, outer hollow cylindrical body 42 (FIG. 1). The eccentric hole of outer cylindrical body 42 has a longitudinal center axis that is parallel to but radially offset a distance from the center axis of outer cylindrical body 42 (the principal axis). Preferably, the holes of cylindrical bodies 44 and 42 have the same eccentricity, i.e. the hole center axes are radially offset the same distance from the respective center axis of bodies 44 and 42. By rotating inner cylindrical body 44 within the eccentric hole of outer cylindrical body 42, or by a mutual, relative rotation of cylindrical bodies 44, 42, it is thus possible to locate the center axis of the eccentric hole of inner cylindrical body 44 such that it, and hence spindle 13 and center axis 16 of cutting tool 14, coincides with the center axis of outer cylindrical body 42. In this case there is no radial offset at all of cutting tool axis 16. By performing a mutual, relative rotation of 180° of the inner and outer cylindrical bodies 44,

42 away from this zero radial offset position, a maximum offset of cutting tool axis 16 is obtained.

Basically, outer cylindrical body 42 is rotatably supported in housing H of apparatus 10 and is rotatable by a motor (not shown) via a belt 46, which engages a belt wheel 48 connected to outer body 42. Likewise, inner cylindrical body 44 is rotatable by a further motor (not shown) via a belt 52, which engages a belt wheel 54 connected to inner body 44 via a coupling 56. Belt wheel 54 is arranged to rotate in a concentric position relative to belt wheel 48.

Machine 10 is equipped with a measuring element 64 for measuring the axial movement of spindle 13, e.g. a linear encoder, which senses the axial position of spindle 13 and cutting tool 14 during the operation of the machine. As shown schematically in FIGS. 2*a* and 2*b*, cutting tool 14 is connected to a low-voltage source U so as to apply an electric potential thereto. FIG. 2*a* illustrates a starting position of cutting tool 14 wherein an electric circuit through the workpiece W connected to ground is broken, while FIG. 2*b* illustrates the initial contact between rotating tool 14 and a workpiece W, where an electric circuit is closed through the workpiece W thereby indicating a first zero reference position of cutting tool 14.

Figure 3:
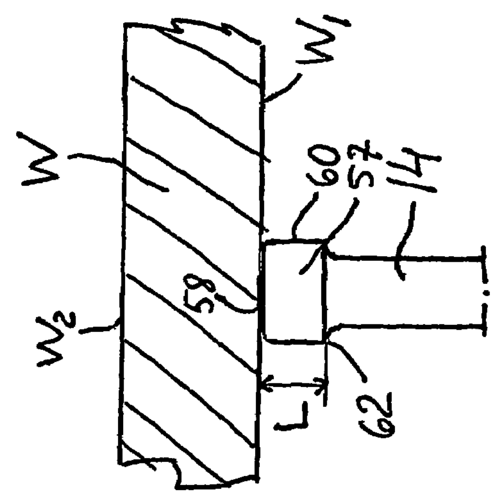
FIG. 3 is a partially cross-sectional schematic side view of an orbiting cutting tool coming into initial electrical contact with a composite-material workpiece.

The method of measuring the depth d of a hole being machined in a composite-material workpiece W by an orbital drilling operation is now described. As shown schematically in FIGS. 2*b* and 3, when rotating cutting tool 14 initially contacts outer surface $W_1$ of workpiece W, the electric potential applied to cutting tool 14 is connected to ground through workpiece W. This indicates a zero reference position of tool 14 from which the depth of the hole is calculated by help of the measuring element, such as a linear encoder associated with machine 10. The hole machining procedure now starts with the rotating cutting tool 14 performing a conventional orbital movement, i.e. tool 14 is rotating also about a principal axis corresponding to the center axis of the hole, while a simultaneous axial movement is performed. As shown in FIG. 3, cutting tool 14 used is preferably an end mill having a cutting head 57 with radially extending axial cutting edges 58 and axially extending radial cutting edges 60 which have an axial length L which is substantially less than the depth of the hole being made.

Figure 4:
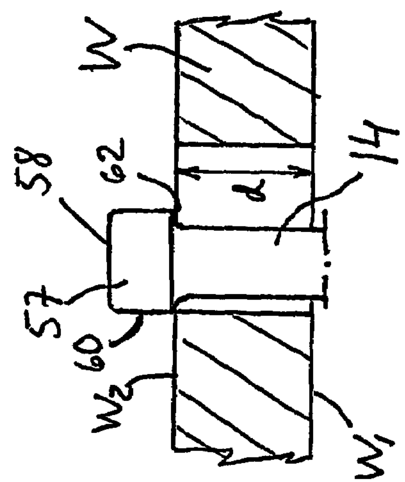
FIG. 4 is a view similar to FIG. 3 illustrating a position of the orbiting cutting tool when the cutting head thereof is just loosing contact with the workpiece after having penetrated the same.

As seen in FIG. 4, when cutting head 57 has penetrated the opposite surface $W_2$ of the workpiece W, i.e. as the rear end 62 of radial edges 60 loses contact with the workpiece, the electric circuit through workpiece W is broken. This second reference position of cutting tool 14 is registered by the measuring element. Now, the depth d of the finished hole can be calculated by deducting length L of cutting head 57 (substantially corresponding to the axial length of the radial cutting edges 60 and the axial height of the axial cutting edges 58 having penetrated the work-piece) from the total length of axial advancement of cutting tool 14 from the first zero reference position to the second reference position where the electric circuit through the workpiece was broken.

Figure 5:
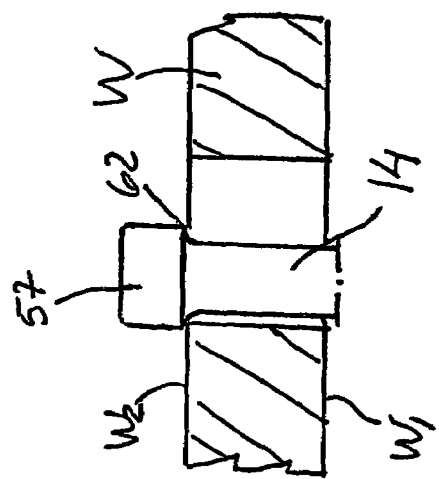
FIG. 5 is a view similar to FIGS. 3 and 4 illustrating the position of the cutting tool when the cutting head thereof has been somewhat radially displaced after the penetration of the workpiece and then brought into contact again with the workpiece.

Alternatively, as shown schematically in FIG. 5, the second reference position can be obtained or reconfirmed by performing a small incremental increase of the radial offset of cutting tool 14 after the penetration of cutting head 57 through rear surface $W_2$ of workpiece W and then axially backing cutting tool 14 to make a new contact with this surface of the workpiece. This indication of the second reference position by closure of an electric circuit may be obtained in a more distinct manner than at the break of the electric circuit.

The presently inventive method is applied to composite-material workpieces in general, such as workpieces including of fiber-reinforced composite materials, metal composite materials including metal-reinforced composites, metal-to-metal composites and metal-to-fiber composites or laminates or stacks of material layers. Composite materials as such include a plurality of material layers.

The methods of the present invention for measuring the depth of a hole in a workpiece may be partly used also for determining a desired depth of a countersink of a hole, where an integrated beveled countersinking portion of the cutting tool is used. Identifying the zero reference position and then advancing the cutting tool a length corresponding to the distance between the distal end of the cutting head and the distal end of the beveled countersinking portion, makes it possible to obtain a predetermined depth of the countersink. Also the depth of a blind hole may be obtained in a similar manner.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of measuring a depth of a hole in a grounded composite-material workpiece being machined by an orbital cutting process, comprising said steps of:

applying a low-level electric potential to an electrically insulated cutting tool, said cutting tool having a longitudinal center axis and a cutting head with both a radial cutting edge and an axial cutting edge and with a predetermined axial length;

rotating said cutting tool about said longitudinal axis;

axially advancing said cutting tool towards the workpiece;

determining a first zero reference position of said cutting tool as said cutting tool initially makes contact with a first outer surface of the workpiece and thereby closing an electric circuit through the workpiece;

keeping a measuring element for measuring an axial movement of said cutting tool activated from said first zero reference position;

performing an orbital rotation of said cutting tool about a principal axis;

axially feeding said cutting tool into the workpiece;

monitoring a specific character of said electric potential during an advancement of said cutting tool through the workpiece;

detecting a point of breaking of said electric circuit when said cutting head of said cutting tool penetrates an opposite second surface of the workpiece; and determining, by help of said measuring element, said depth of said hole by deducting said predetermined axial length of said cutting head having penetrated the workpiece from a total length of axial advancement of said cutting tool from said first zero reference position to said point of breaking of said electric circuit through the workpiece.

2. The method of claim 1, wherein the composite-material workpiece includes at least two layers of material.

3. The method of claim 2, wherein at least one of said layers includes a fiber-reinforced composite material.

4. A method of measuring a depth of a hole in a grounded composite-material workpiece being machined by an orbital cutting process, comprising said steps of:

applying a low-level electric potential to an electrically insulated cutting tool, said cutting tool having a longitudinal center axis and a cutting head with both a radial cutting edge and an axial cutting edge and with a predetermined axial length;

rotating said cutting tool about said longitudinal axis;

axially advancing said cutting tool towards the workpiece;

determining a first zero reference position of said cutting tool as said cutting tool initially makes contact with a first outer surface of the workpiece and thereby closing an electric circuit through the workpiece;

keeping a measuring element for measuring an axial movement of said cutting tool activated from said first zero reference position;

performing an orbital rotation of said cutting tool about a principal axis;

axially feeding said cutting tool into the workpiece;

monitoring a specific character of said electric potential during an advancement of said cutting tool through the workpiece;

detecting a point of breaking of said electric circuit when said cutting head of said cutting tool penetrates an opposite second surface of the workpiece;

performing a small incremental increase of said radial offset of said cutting tool;

axially backing said cutting tool to make contact with said second surface of the workpiece for determining a second reference position of said cutting tool as it recloses said electric circuit; and calculating the depth of the hole produced by said cutting tool by a help of said first zero reference position and said second reference position.

5. An orbital machining apparatus for producing a hole in a composite-material workpiece and measuring a depth of the hole, said apparatus comprising:

a rotatable spindle including ceramic bearings electrically insulating said rotatable spindle from surrounding components of said orbital machining apparatus;

a cutting tool being carried by said rotatable spindle, said cutting tool having a longitudinal center axis and a cutting head with both a radial cutting edge and an axial cutting edge and with a predetermined axial length;

a first actuator configured for rotating said cutting tool about said longitudinal center axis during a machining of the hole;

a second actuator configured for moving said cutting tool in an axial feed direction towards and into the workpiece substantially parallel to said tool axis, said second actuator being simultaneously operable with said first actuator;

a third actuator configured for rotating said cutting tool about a principal axis, said principal axis being substantially parallel to said longitudinal center axis of said cutting tool and coaxial with a longitudinal center axis of the hole to be machined, said third actuator being simultaneously operable with said first actuator and second actuator;

a radial offset mechanism configured for controlling a radial distance of said longitudinal center axis cutting tool from said principal axis;

a low voltage source connected to said rotatable spindle; and a measuring element connected to said rotatable spindle, said measuring element for measuring an axial movement of said rotatable spindle, said measuring element being configured to register a first zero reference position of said cutting tool when said cutting tool initially makes contact with a first surface of the workpiece and closes an electric circuit with a ground through the workpiece, and to register a second reference position, when one of said electric circuit is broken as said cutting head has penetrated an opposite second surface of the workpiece and when said cutting head, after penetrating the second surface, is backed to make contact with the second surface of the workpiece for determining said second reference position of said cutting tool as it recloses said electric circuit with said ground.

* * * * *

UNITED STATES PATENT AND TRADEMARK OFFICE

CERTIFICATE OF CORRECTION

PATENT NO. : 7,351,018 B2
APPLICATION NO. : 10/559640
DATED : April 1, 2008
INVENTOR(S) : Oden at al.

It is certified that error appears in the above-identified patent and that said Letters Patent is hereby corrected as shown below:

Title Page; item (60);
After the Prior Publication Data and before the Int. Cl., please insert the following:
--Related U.S. Application Data
Provisional application No. 60/320,244, filed June 2, 2003 and Provisional application No. 60/481,027, filed June 26, 2003.--

Signed and Sealed this

Seventh Day of October, 2008

JON W. DUDAS
*Director of the United States Patent and Trademark Office*